Patented Sept. 24, 1929

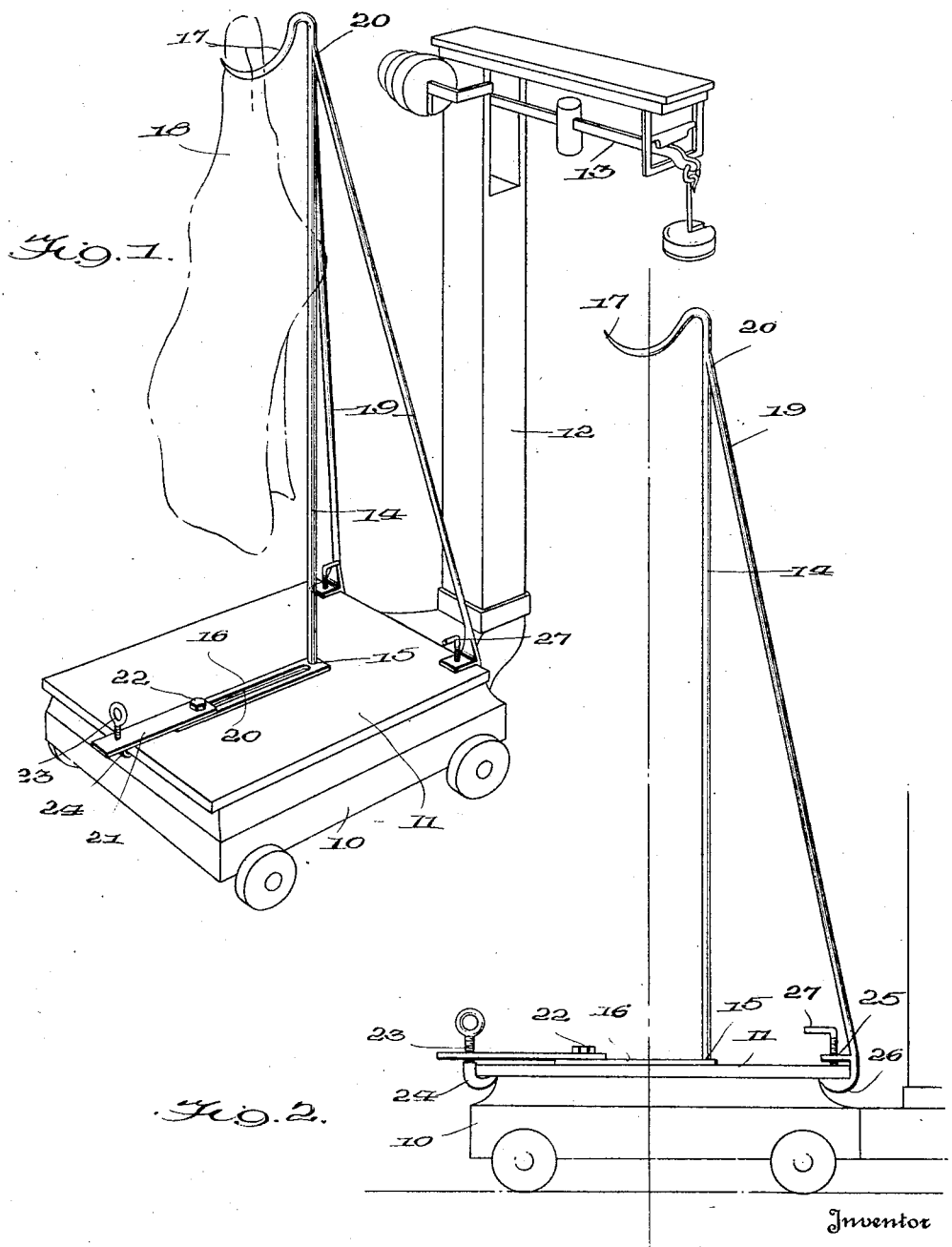

1,728,988

UNITED STATES PATENT OFFICE

RICHARD E. YOUNGER AND HARRY C. YOUNGER, OF HOLDREGE, NEBRASKA

ATTACHMENT FOR SCALES

Application filed July 2, 1928. Serial No. 289,950.

The present invention relates to an article supporting attachment particularly adapted for use with platform scales.

Heretofore it has been customary when weighing various articles on a platform scale, such as cuts of beef or the like, to have a man stand on the scale with the article and weigh the two together and then subtract the weight of the man from the total weight. Such means of weighing is not only expensive as it comsumes considerable time, but also is often inaccurate.

Accordingly, one of the primary objects of the invention consists in providing an article supporting attachment that can be readily connected to or removed from a platform scale, in order that various articles or animals may be expeditiously and accurately weighed.

Another object of the invention is to provide a light simple, efficient and inexpensive weighing attachment for platform scales, which is of durable construction and may be conveniently used with scales of different types.

A further object comprehends the provision of means for maintaining the article supporting attachment in a central position on the scale, so as to insure the accurate weighing of the articles thereon.

Further objects and advantages of the invention will become apparent from the following description, when taken in conjunction with the accompanying drawings.

Referring to the drawings, in which like numerals indicate like parts in the various figures:

Figure 1 is a perspective view of a platform scale with the article attachment connected thereto, and shows in dotted lines, a quarter of beef carried by the supporting member.

Figure 2 is a side elevation of Figure 1.

Referring to the drawings, in which like numerals indicate like parts in the various figures, 10 denotes a portable weighing scale which is provided with a weighing platform 11, standard 12 and scale beam 13, of any conventional construction.

In order that various articles may be quickly and accurately weighed by the scale, there is provided an attachment which essentially comprises a metal rod, standard or the like 14, that extends upwardly from the platform 11 and is connected at its lower extremity, as at 15, to a flat base 16, that is arranged to rest against the top surface of the platform 11. The upper end of the rod 14, preferably terminates in a hook or other suitable engaging member 17 which, as shown in Figure 1, carries a quarter of beef 18, that is being weighed by the scale.

Diverging brace arms 19 are preferably connected, as at 20, to the upper end of the rod 14 in any suitable manner such as by welding or the like, so as to support the same and form with the rod 14, a tripod attachment of light and sturdy character and one which may be conveniently applied to or removed from a platform scale.

In order that the attachment may be connected to scales of various sizes and shapes, the base 16 has a longitudinal slot 20, to which is slidably and adjustably connected a bar 21, by a set screw 22. The base 16 is detachably secured to the platform 11 by a threaded clamping member 23, which extends through the outer end portion of the bar 21 and is provided with a curved lug or hook 24, arranged to engage the underside of the platform 11 (Fig. 2). The lower end of each of the brace rods 19, preferably, is formed with laterally spaced lugs 25 and 26, which receive the adjacent end of the platform 11. A set screw 27 extends through the arm 25, and engages the upper face of the platform 11, so as to co-act with the lug 26, to maintain the brace rods 19 firmly in clamped position. Obviously, instead of the base 16 being formed with slot 20, the arm 21 may be provided with the same and the set screw or pin 22 be stationarily connected to the base 16.

The rod 14, in order to accurately weigh the articles supported thereby, is positioned substantially along the longitudinal, central or medial line of the platform 11, while the hook 17 is disposed so as to be in substantially vertical alignment with the base 16, as shown in dotted lines in Figure 2. Moreover, the attachment, by reason of the slidable and adjustable connection of the arm 21 with the base 16, may readily be connected to scales of various lengths or sizes.

It will be seen that by reason of the present invention, there is provided a light, portable attachment which may be quickly connected to or removed from scales of various types, in order that articles or live stock may be accurately weighed.

It is to be understood that the form of the invention herewith shown and described is merely illustrative of a preferred embodiment and that such changes may be made therein as fall within the purview of one skilled in the art, without departing from the spirit of the invention or the scope of the appended claim.

What we claim is:

An attachment for platform scales comprising a base having sections longitudinally adjustable relative to the scale platform, a standard extending upwardly from said base and having an article supporting hook projecting laterally therefrom and disposed symmetrically relative to the scale platform, brace arms extending downwardly from the top of said standard, means detachably connecting the outer end of one of said sections and the free ends of said arms to the ends of the platform, and means for securing the sections in a predetermined adjusted position whereby the hook will be arranged directly over the longitudinal and transverse centers of the scale platform to insure accurately weighing the article carried thereby.

In testimony whereof we have hereunto set our hands.

RICHARD E. YOUNGER.
HARRY C. YOUNGER.